United States Patent
Fujiwara et al.

(10) Patent No.: US 7,489,099 B2
(45) Date of Patent: Feb. 10, 2009

(54) ELECTRICAL DRIVE CONTROL DEVICE AND ELECTRICAL DRIVE CONTROL METHOD

(75) Inventors: Isao Fujiwara, Nagoya (JP); Zhiqian Chen, Anjo (JP)

(73) Assignee: Aisin AW Co., Ltd., Anjo (JP)

( * ) Notice: Subject to any disclaimer, the term of this patent is extended or adjusted under 35 U.S.C. 154(b) by 163 days.

(21) Appl. No.: 11/727,351

(22) Filed: Mar. 26, 2007

(65) Prior Publication Data

US 2007/0241715 A1    Oct. 18, 2007

(30) Foreign Application Priority Data

Mar. 31, 2006    (JP) .............................. 2006-099312

(51) Int. Cl.
*G05B 11/36*    (2006.01)
(52) U.S. Cl. ..................... 318/609; 318/727; 318/432; 318/433
(58) Field of Classification Search ................. 318/609, 318/727, 432, 433, 434, 400.15, 400.22
See application file for complete search history.

(56) References Cited

U.S. PATENT DOCUMENTS

2002/0169079 A1* 11/2002 Suzuki et al. ............... 505/100
2004/0262074 A1   12/2004 Nagase et al.

FOREIGN PATENT DOCUMENTS

| JP | A 11-150996 | 6/1999 |
|---|---|---|
| JP | A-2001-069782 | 3/2001 |
| JP | A-2003-070280 | 3/2003 |
| JP | A-2003-339183 | 11/2003 |
| JP | A-2005-006420 | 1/2005 |
| JP | A-2005-057834 | 3/2005 |

\* cited by examiner

*Primary Examiner*—Karen Masih
(74) *Attorney, Agent, or Firm*—Oliff & Berridge, PLC

(57) ABSTRACT

An electric drive control apparatus and method calculates a current command value based on an electric machine target torque that represents a target value of a torque of an electric machine; calculates a current deviation between the current command value and a current applied to the electric machine; calculates a first inductance and a second inductance that each have a different amount of change caused by a change in the current; calculates an interference term based on the first inductance; calculates a proportional term and an integral term based on the current deviation and the second inductance; and calculates a voltage command value based on the interference term, the proportional term and the integral term.

15 Claims, 8 Drawing Sheets

ELECTRICAL DRIVE CONTROL DEVICE AND ELECTRICAL DRIVE CONTROL METHOD

INCORPORATION BY REFERENCE

The disclosure of Japanese Patent Application No. 2006-099312 filed on Mar. 31, 2006, including the specification, drawings, and abstract, is incorporated herein by reference in its entirety.

BACKGROUND

The present invention relates to an electric drive control apparatus and an electric drive control method.

Generally, an electric vehicle, for example an electric automobile, is provided with a drive motor as an electric machine. A hybrid vehicle includes a drive motor and a generator as the first and the second electric machines, respectively. Both the drive motor and the generator are disposed to be rotatable, and each include (1) a rotor with a magnetic pole pair each formed of the permanent magnets of N pole and S pole, respectively, and (2) a stator disposed radially outward of the rotor, with the stator having stator coils at U, V and W phases, respectively.

The electric drive unit is disposed for driving the drive motor in order to generate the drive motor torque or the generator in order to generate the generator torque. The drive motor control unit for driving the drive motor and the generator control unit for driving the generator are disposed as the electric machine control system in order (1) to send pulse width modulation signals at U-phase, V-phase and W-phase generated by the drive motor control unit and the generator control unit to the inverter, and (2) to supply the phase current generated by the inverter, that is, the current at the U-phase, V-phase and W-phase to the stator coil such that the drive motor torque and the generator torque are generated.

Assuming that the direction along the magnetic pole pair of the rotor is defined as a d-axis, and the direction perpendicular to the d-axis is defined as a q-axis, the drive motor control unit executes a feedback control through the vector control calculation on the d-q axis model. The drive motor control unit detects the current applied to each stator coil, the magnetic pole position of the rotor, and a DC voltage at the inlet of the inverter and the like. The drive motor control unit also converts the detected current into the d-axis current and the q-axis current based on the magnetic pole position. Then, the drive motor control unit calculates a d-axis current command value and a q-axis current command value that each represent the target value of the d-axis current and the q-axis current in reference to the current command value map. As such, a d-axis voltage command value and a q-axis voltage command value each represent the target value of the d-axis voltage and the q-axis voltage calculated based on the deviation between the d-axis current and the d-axis current command value, the deviation between the q-axis current and the q-axis current command value, and parameters of the drive motor.

A drive motor target torque that represents the target value of the drive motor torque, and the d-axis current command value and the q-axis current command value in correlation with the DC voltage and the angular velocity are stored in the current command value map. The parameters include a counter-electromotive voltage constant MIf, the winding resistance Ra of each stator coil, and inductances Ld and Lq, which are used for calculation of the interference term so as to suppress the interference between the axes d and q (see, for example, Japanese Patent Application Publication No. JP-A-11-150996).

SUMMARY

However, in the conventional electric machine control unit, the inductances Ld and Lq vary depending on the driving state of the drive motor or the generator in order to change the characteristics of the control system. The drive motor or the generator are thus not driven in a stable state.

The present invention thus provides, among other things, an electric drive control apparatus and an electric drive control method that are capable of preventing the change in characteristics of the control system and are capable of driving the electric machine in the stable state by solving the problem of the conventional art electric machine control unit The electric drive control apparatus according to an exemplary aspect includes a current command value calculation processing that calculates a current command value based on an electric machine target torque that represents a target value of a torque of an electric machine; a deviation calculation processing device that calculates a current deviation between the current command value and a current applied to the electric machine; a parameter calculation processing device that calculates a first inductance and a second inductance that each have a different amount of change caused by a change in the current; a interference term calculation processing device that calculates an interference term based on the first inductance; a proportional-integral term calculation processing device that calculates a proportional term and an integral term based on the current deviation and the second inductance; and a voltage command value adjustment processing device that calculates a voltage command value based on the interference term, the proportional term and the integral term.

In an electric drive control method according to an exemplary aspect, the method includes the steps of calculating a current command value based on an electric machine target torque that represents a target value of a torque of an electric machine; calculating a current deviation between the current command value and a current applied to the electric machine; calculating a first inductance and a second inductance that each have a different amount of change caused by a change in the current; calculating an interference term based on the first inductance; calculating a proportional term and an integral term based on the current deviation and the second inductance; and calculating a voltage command value based on the interference term, the proportional term and the integral term.

The electric drive control apparatus according to an exemplary aspect includes a controller that calculates a current command value based on an electric machine target torque that represents a target value of a torque of an electric machine; calculates a current deviation between the current command value and a current applied to the electric machine; calculates a first inductance and a second inductance that each have a different amount of change caused by a change in the current; calculates an interference term based on the first inductance; calculates a proportional term and an integral term based on the current deviation and the second inductance; and calculates a voltage command value based on the interference term, the proportional term and the integral term.

BRIEF DESCRIPTION OF THE DRAWINGS

Various exemplary aspects of the invention will be described with reference to the drawings, wherein.

DETAILED DESCRIPTION OF EMBODIMENTS

The present invention will be explained in detail below with reference to the drawings. An electric drive unit mounted, for example, on the electric automobile as the electric vehicle or the hybrid vehicle for driving the drive motor as the electric machine, and an electric drive control apparatus for operating the electric drive unit will be described.

Figure 2:
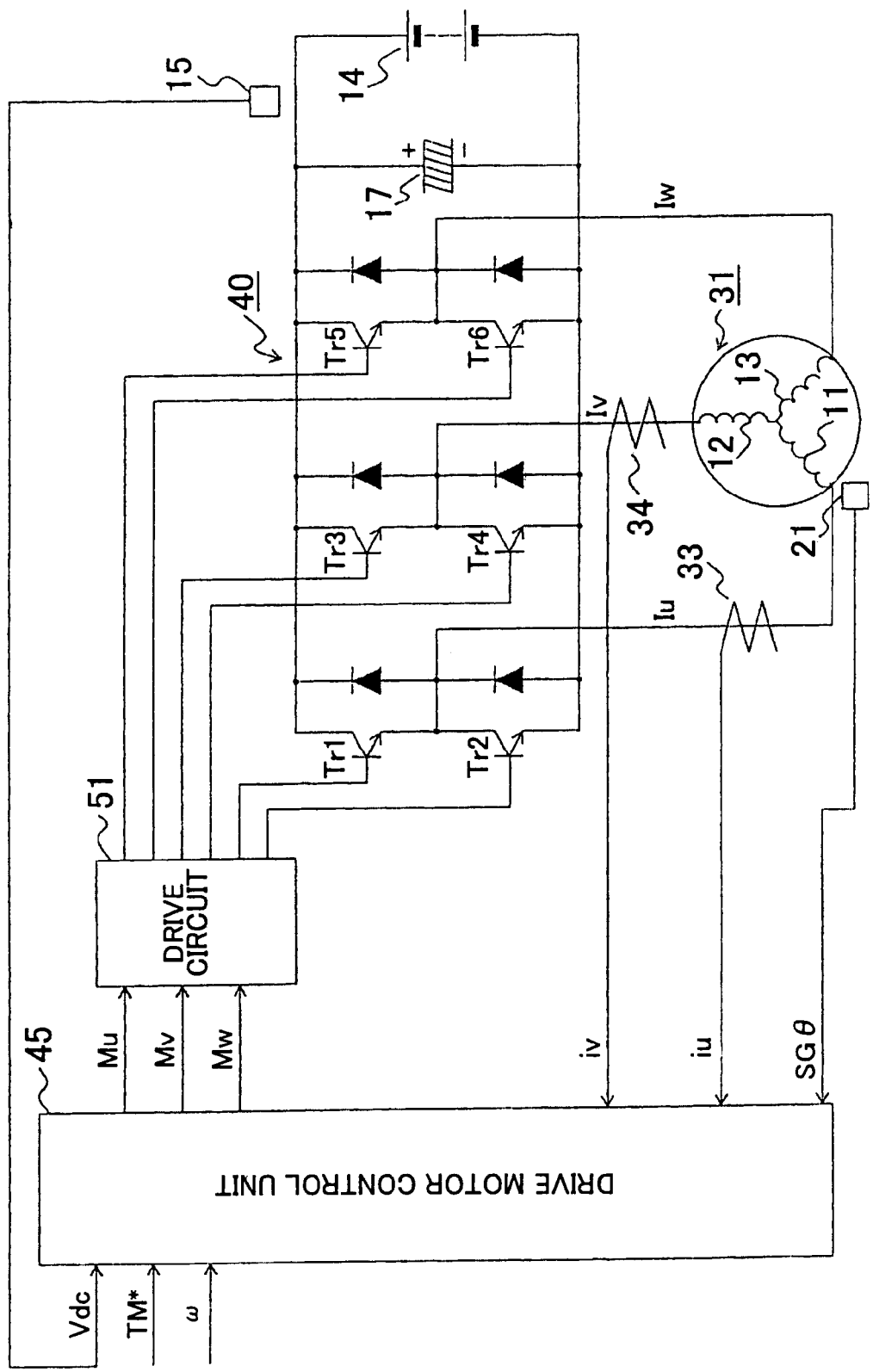
FIG. 2 is a conceptual view of the electric drive unit according to the embodiment of the present invention.

Referring to FIG. 2, a reference numeral 31 denotes a drive motor that includes a rotor (not shown) attached to the drive shaft of the electric automobile in a freely rotating manner, and a stator disposed radially outward of the rotor. The rotor includes a rotor core, and permanent magnets disposed in the circumferential direction of the rotor core at a plurality of positions at regular intervals. The magnetic pole pair is formed of the S-pole and the N-pole of the permanent magnet. The stator includes stator cores circumferentially provided at a plurality of positions with teeth formed thereon, which protrude radially inward, and stator coils 11 to 13 as U-phase, V-phase and W-phase wound around the teeth.

An output shaft of the rotor is provided with a magnetic pole position sensor 21 serving as a magnetic pole position detection unit for detecting a magnetic pole position of the rotor. The magnetic pole position sensor 21 generates a magnetic pole position signal SGθ as a sensor output so as to be sent to a drive motor control unit 45 serving as the electric machine control unit. A resolver may be disposed as the magnetic pole position detection unit instead of the magnetic pole position sensor 21 to generate the magnetic pole position signal.

The DC current from a battery 14 is converted into the phase current by an inverter 40 serving as the current generator, that is, the currents Iu, Iv and Iw at the U-phase, V-phase and W-phase, respectively, so as to be applied to the corresponding stator coils 11 to 13.

The inverter 40 includes six transistors Tr1 to Tr6 serving as the switching elements and the inverter 40 transmits the drive signal generated by a drive circuit 51 to transistors Tr1 to Tr6. Thereby each transistor Tr1 to Tr6 is selectively turned ON/OFF such that the currents at the respective phases Iu, Iv and Iw are generated. As the inverter 40, alternatively, a power module, for example, IGBT formed by combining two to six switching elements into one package, or an IPM formed by combining a drive circuit and the like with the IGBT may be employed.

A voltage sensor 15 as a voltage detection unit is disposed at the inlet through which the current is applied from the battery 14 to the inverter 40 for detecting the DC voltage Vdc at the inlet of the inverter 40 so as to be supplied to the drive motor control unit 45. The use of the battery voltage is allowed as the DC voltage Vdc. In this case, the battery 14 is provided with a battery voltage sensor as the voltage detection unit.

The electric drive unit is formed of the drive motor 31, the inverter 40, the drive circuit 51 and a not shown drive wheel. A reference numeral 17 denotes a capacitor.

As the stator coils 11 to 13 are star connected, if the current values at two selected phases are defined, the current value at the remaining phase is also defined.

For the purpose of controlling the currents Iu, Iv and Iw of the respective phases, for example, the lead wires of the stator coils 11 and 12 at the U-phase and V-phase are provided with current sensors 33 and 34 each serving as the current detection unit for detecting the currents Iu and Iv at the U-phase and V-phase respectively such that the current sensors 33 and 34 send the detected currents as iu and iv to the drive motor control unit 45.

The drive motor control unit 45 includes a recording unit (not shown), for example, RAM and ROM for recording data and various programs in addition to the CPU (not shown) serving as the computer. The recording unit stores first and second current command value maps. An MPU may be employed instead of the CPU.

Instead of the ROM which stores various programs and data, other recording medium disposed as an external memory unit, for example a hard disk, may be employed. In this case, a flash memory may be provided in the drive motor control unit 45 to store the program and data loaded from the recording medium. Accordingly, the program and data may be updated by replacing the external recording medium.

Next, the operation of the drive motor control unit 45 will be described.

The position detection processing device (not shown) of the drive motor control unit 45 executes position detection processing to load the magnetic pole position signal SGθ sent from the magnetic pole position sensor 21, and to detect the magnetic pole position θ based on the magnetic pole position signal SGθ. The rotating speed calculation processing device of the position detection processing device executes rotating speed calculation processing to calculate the angular velocity ω of the drive motor 31 based on the magnetic pole position signal SGθ. The rotating speed calculation processing device obtains a drive motor rotating speed NM as the rotating speed of the drive motor 31, where p is the magnetic poles, based on the angular velocity ω using the following equation:

$$NM = 60 \times (2/p) \times \omega/2\pi$$

The electric machine rotating speed is defined by the drive motor rotating speed NM.

The detection current acquisition processing device (not shown) of the drive motor control unit 45 executes detection current acquisition processing to load and obtain the detected currents iu and iv. The detection current iw is obtained based on detection currents iu and iw using the following equation:

$$iw = -iu - iv$$

The drive motor control processing device (not shown) of the drive motor control unit 45 executes drive motor control processing to drive the drive motor 31 based on the drive motor target torque TM*, detected currents iu, iv and iw, the magnetic pole position θ and the DC voltage Vdc. In this embodiment, the drive motor control unit 45 executes the feedback control through the vector control calculation on the d-q axis model on the assumption that the d-axis is set in the direction of the magnetic pole pair of the rotor and the q-axis is set to be perpendicular to the d-axis.

The vehicle speed detection processing device (not shown) of the drive motor control unit 45 executes vehicle speed detection processing to detect a vehicle speed V corresponding to the drive motor rotating speed NM. The detected vehicle speed V is sent to the vehicle control unit (not shown) for executing the entire control of the electric automobile. The vehicle command value calculation processing device of the vehicle control unit executes vehicle command value calculation processing to load the vehicle speed V and the accelerator opening degree α, based on which a vehicle request torque TO* is calculated. The drive motor target torque TM* is generated corresponding to the vehicle request torque TO* so as to be sent to the drive motor control unit 45.

Figure 3:
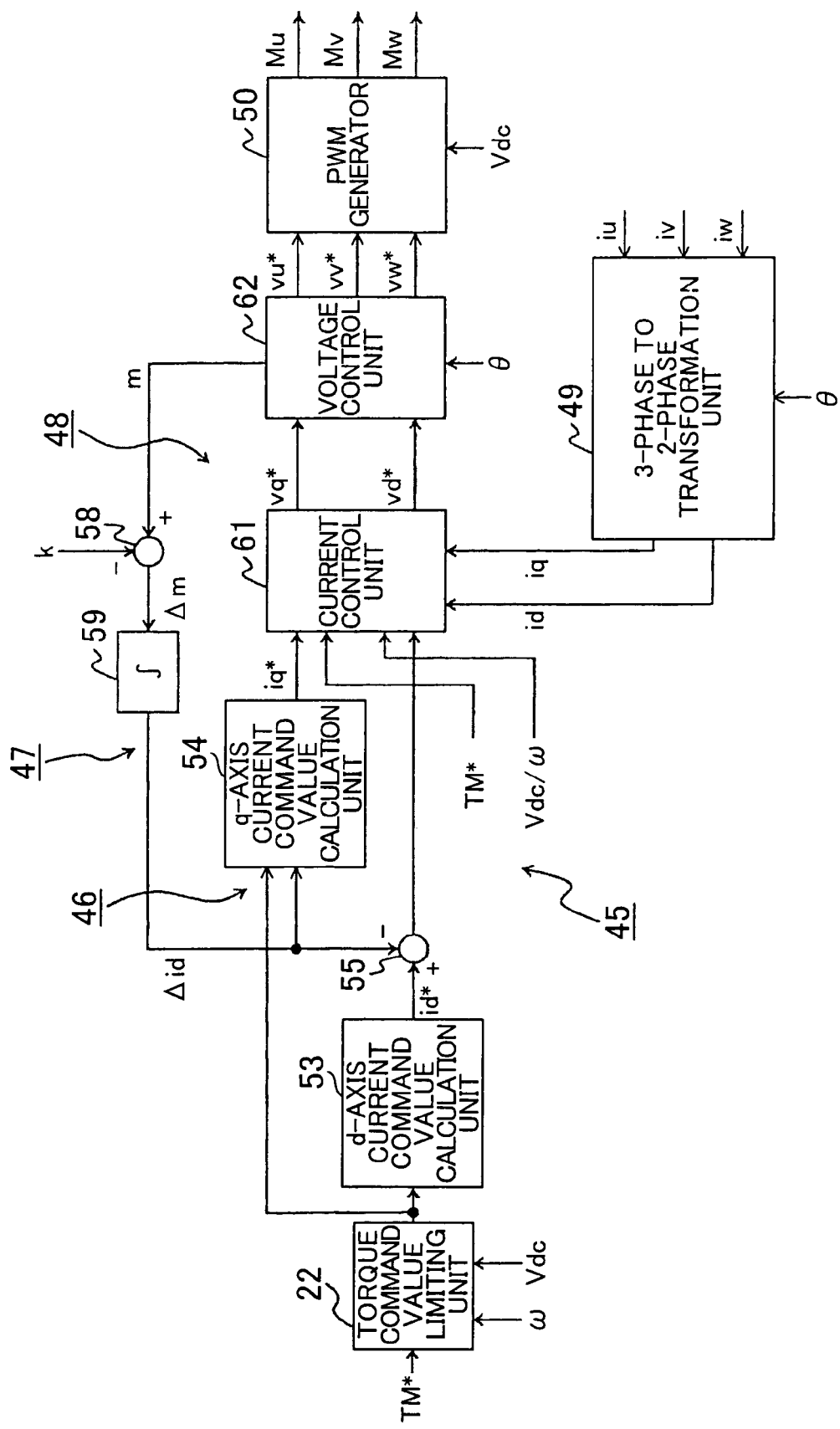
FIG. 3 is a block diagram showing a portion of the drive motor control unit according to the embodiment of the present invention.

In FIG. 3, the drive motor control processing device of the drive motor control unit 45 includes a torque command value limiting unit 22 as the torque command value limit processing device, a current command value set unit 46 as the current command value set processing device, a weak magnetic field control unit 47 as the weak magnetic field control processing device, a voltage command value set unit 48 as the voltage command value set processing device, a 3-phase to 2-phase transformation unit 49 and a PWM generator 50 as the output signal generation processing device such that the drive motor 31 is driven based on the drive motor target torque TM*.

The current command value set unit 46 includes a d-axis current command value calculation unit (maximum torque control unit) 53 and a subtractor 55 as the first axis current command value set processing device, a q-axis current command value calculation unit (iso-torque control unit) 54 as the second axis current command value set processing device for executing the current command value set processing. The d-axis current command value calculation unit 53 and the subtractor 55 execute first axis current command value set processing to calculate a d-axis current command value id* as a first current command value representing the target value of the d-axis current id. The q-axis current command value calculation unit 54 executes a second axis current command value set processing to calculate a q-axis current command value iq* as a second current command value representing a target value of the q-axis current iq. Note that the d-axis current command value calculation unit 53 forms the first current command value calculation processing device and the maximum torque control processing device. The q-axis current command value calculation unit 54 forms the second current command value calculation processing device and the iso-torque control unit processing device, and the subtractor 55 forms the current command value adjustment processing device.

The weak magnetic field control unit 47 includes a subtractor 58 as the voltage saturation index calculation processing device, and a d-axis current adjustment control unit 59 as the voltage saturation determination processing device and weak magnetic field current calculation processing device so as to execute the weak magnetic field control processing. When the DC voltage Vdc (or battery voltage) becomes low, and the angular velocity ω (or rotating speed NM of the drive motor) becomes high, the weak magnetic field control is automatically executed. Note that the d-axis current adjustment control unit 59 is formed of an integrator.

The 3-phase to 2-phase transformation unit 49 executes 3-phase to 2-phase transformation, and loads the magnetic pole position θ to convert the detected currents iu, iv and iw into the d-axis current id and q-axis current iq. The d-axis current id and the q-axis current iq are calculated as the actual current values so as to be sent to the voltage command value set unit 48.

The voltage command value set unit 48 includes a current control unit 61 as a current control processing device and axis voltage command value set processing device, and a voltage control unit 62 as the voltage control processing device and second phase transformation processing device so as to execute the voltage command value set processing.

The PWM generator 50 executes the output signal generation processing to generate pulse-width modulation signals Mu, Mv and Mw as output signals so as to be sent to the drive circuit 51.

In response to the pulse-width modulation signals Mu, Mv and Mw at the respective phases, the drive circuit 51 generates six drive signals to be sent to the inverter 40. Based on the pulse-width modulation signals Mu, Mv and Mw, the inverter 40 generates currents Iu, Iv and Iw at the respective phases through switching among the transistors Tr1 to Tr6. The currents Iu, Iv and Iw at the respective phases are sent to the stator coils 11 to 13 of the drive motor 31, respectively.

The torque control is executed based on the drive motor target torque TM* to drive the drive motor 31 for allowing the electric automobile to travel.

Next, the operation of the current command value set unit 46 will be described.

In this case, the current command value set unit 46 loads the drive motor target torque TM*, the angular velocity ω and the DC voltage Vdc to calculate the d-axis current command value id* and the q-axis current command value iq*.

Figure 4:
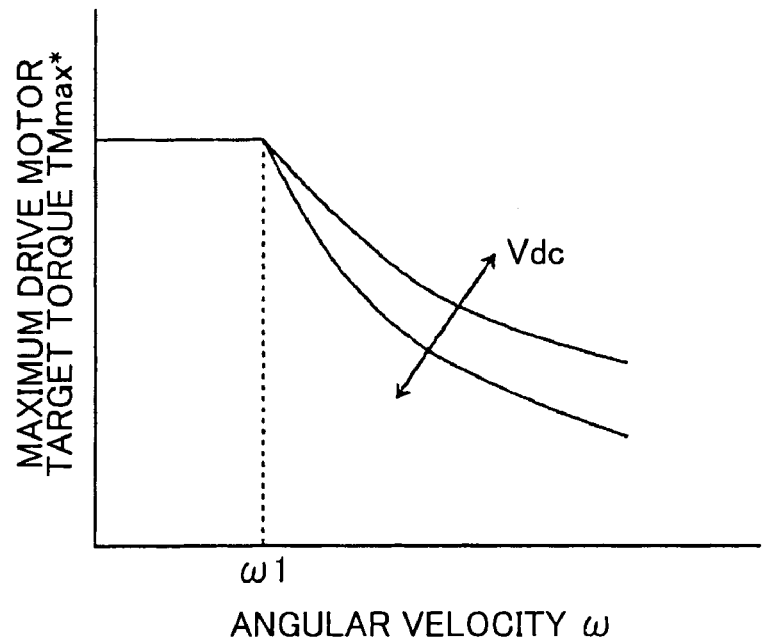
FIG. 4 is a view showing a maximum drive motor target torque map according to the embodiment of the present invention.

When the vehicle command value calculation processing device sends drive motor target torque TM* to the drive motor control unit 45, the torque command value limiting unit 22 executes the torque command value limit processing to load the DC voltage Vdc, the angular velocity ω and the drive motor target torque TM*. The maximum drive motor target torque TMmax* corresponding to the DC voltage Vdc and the angular velocity ω is loaded in reference to the maximum drive motor target torque map stored in the recording unit as shown in FIG. 4 (the x-axis is set as an angular velocity ω, and the y-axis is set as a maximum drive motor target torque TMmax*) in order to limit the drive motor target torque TM* so as not to exceed the maximum drive motor target torque TMmax*.

If the angular velocity ω is equal to or lower than a predetermined value ω1 in reference to the maximum drive motor target torque map, the maximum drive motor target torque TMmax* takes a constant value. If the angular velocity ω exceeds the value ω1, the maximum drive motor target torque TMmax* becomes small in a curved state. In the region where the angular velocity ω exceeds the value ω1, the maximum drive motor target torque TMmax* is made large as the DC voltage Vdc becomes high, and is made small as the DC voltage Vdc becomes low. Note that the maximum drive motor target torque map forms the maximum electric machine target torque map, and the maximum drive motor target torque TMmax* forms the maximum electric machine target torque, respectively.

Figure 5:
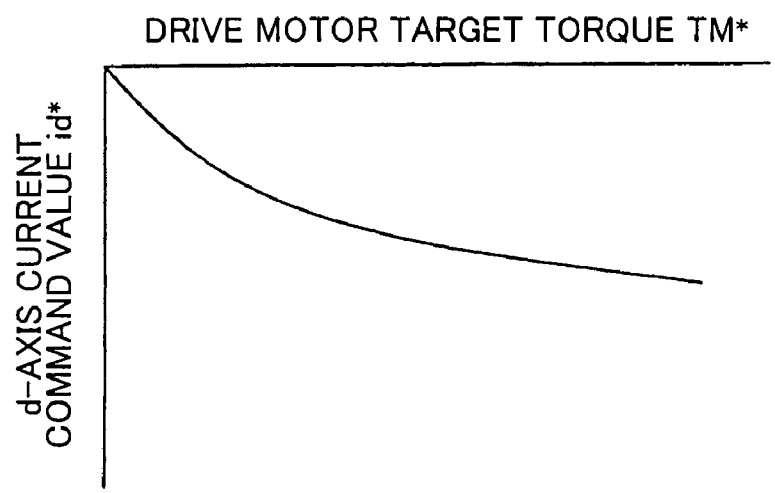
FIG. 5 is a view showing a first current command value map according to the embodiment of the present invention.

The d-axis current command value calculation unit 53 executes the first current command value calculation processing and the maximum torque control processing to load the drive motor target torque TM* which has been limited by the torque command value limiting unit 22. The d-axis current command value id* corresponding to the drive motor target torque TM* is loaded in reference to the first current command value map recorded in the recording unit as shown in FIG. 5 (the x-axis is set as a drive motor target torque TM* which represents the target value of the drive motor torque as the torque of the drive motor 31, and the y-axis is set as a d-axis current command value id*) such that the obtained d-axis current command value id* is sent to the subtractor 55.

Referring to the first current command value map, the d-axis current command value id* is set such that the absolute value of the current amplitude command value for achieving the drive motor target torque TM* is minimized. In the first current command value map, the drive motor target torque TM* takes a positive or a negative value, the d-axis current command value id* takes the negative value, and the drive motor target torque TM* is set to 0, the d-axis current command value id* is set to 0. The d-axis current command value id* is made large in the negative direction as the drive motor target torque TM* becomes large in either the positive or the negative direction.

When the d-axis current command value id* is calculated, the q-axis current command value calculation unit 54 executes the second current command value calculation processing and the iso-torque control processing to load the drive motor target torque TM* limited by the torque command value limiting unit 22 and the d-axis current command value id* sent from the subtractor 55. The q-axis current command value iq* corresponding to the drive motor target torque TM* and the d-axis current command value id* is loaded in reference to the second current command value map shown in FIG. 6 (the x-axis is set as the d-axis current command value id*, and the y-axis is set as a q-axis current command value iq*) such that the obtained q-axis current command value iq* is sent to the current control unit 61.

In the second current command value map, the larger the drive motor target torque TM* becomes, the larger the d-axis current command value id* becomes in the negative direction, and the larger the q-axis current command value iq* becomes in the positive or the negative direction. Also, the smaller the drive motor target torque TM* becomes, the smaller the d-axis current command value id* becomes in the negative direction, and the smaller the q-axis current command value iq* becomes in the positive or the negative direction. When the drive motor target torque TM* is kept constant, the q-axis current command value iq* becomes small in the positive or the negative direction when the d-axis current command value id* becomes large in the negative direction.

The operation of the weak magnetic field control unit 47 will be described below.

The drive motor 31 generates the counter-electromotive force as the rotor rotates. The higher the drive motor rotating speed NM becomes, the higher the terminal voltage of the drive motor 31 becomes high. When the terminal voltage exceeds the threshold value, the voltage saturation occurs, thus disabling the drive motor 31 to output.

The modulation factor calculation processing device (not shown) of the voltage control unit 62 executes the modulation factor calculation process to load the d-axis voltage command value vd*, the q-axis voltage command value vq* and the DC voltage Vdc such that the voltage amplitude |v| is expressed in the following equation:

$$|v| = \sqrt{vd^{*2} + vq^{*2}} \quad \ldots(1)$$

The voltage amplitude |v| is divided by the theoretical maximum voltage Vmax, that is, Vmax=0.78×Vdc to calculate the modulation factor m as expressed by the following equation:

$$m = |v| / Vmax \quad (2)$$
$$= \sqrt{vd^{*2} + vq^{*2}} / Vmax$$

The modulation factor m is then sent to the subtractor 58. The modulation factor m is the value that represents the degree of the voltage amplitude |v|.

The subtractor 58 executes the voltage saturation index calculation processing to load the modulation factor m, and the command value of the modulation factor m that has been preliminarily calculated by the modulation factor command value calculation unit (not shown), that is, the modulation factor command value k so as to obtain the voltage saturation index Δm representing the degree of the voltage saturation, that is, Δm=m−k. The voltage saturation index Δm is then sent to the d-axis current adjustment control unit 59.

Subsequently, the d-axis current adjustment control unit 59 executes the voltage saturation determination processing and the weak magnetic field current calculation processing to add the voltage saturation index Δm at each control timing to obtain the summed value ΣΔm. It is then determined whether the voltage saturation has occurred based on the judgment whether the summed value ΣΔm takes the positive value. If the summed value ΣΔm takes the positive value, and accordingly the voltage saturation has occurred, the summed value ΣΔm is multiplied by the proportional constant to calculate and set the weak magnetic field current Δid as the adjustment value for executing the weak magnetic field control. If the summed value ΣΔm takes the value equal to or smaller than zero, and accordingly, the voltage saturation has not occurred, the weak magnetic field current Δid is set to zero.

The weak magnetic field current Δid is sent to the subtractor 55. Upon reception of the weak magnetic field current Δid, the subtractor 55 executes the current command value adjustment processing to adjust the d-axis current command value id* by subtracting the weak magnetic field current Δid therefrom, and sends the adjusted d-axis current command value id* to the current control unit 61.

In this case, when the weak magnetic field current Δid takes the value zero, the d-axis current command value id* is not substantially adjusted, and the weak magnetic field control is not executed neither. Meanwhile, when the weak magnetic field current Δid takes the positive value, the d-axis current command value id* is adjusted to make the value large in the negative direction, and the weak magnetic field control is thus executed.

Figure 6:
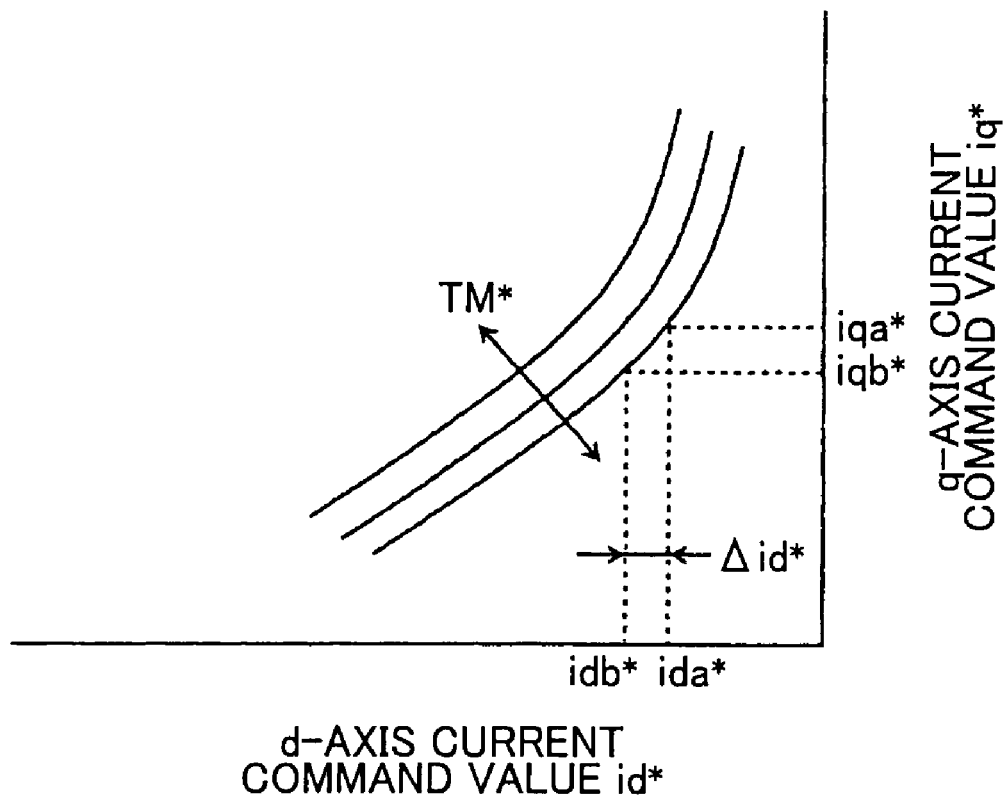
FIG. 6 is a view showing a second current command value map according to the embodiment of the present invention.

Assuming that the value of the d-axis current command value id* sent to the subtractor 55 is ida* as shown in FIG. 6, if the weak magnetic field current Δid is zero and accordingly the weak magnetic field control is not executed, the q-axis current command value calculation unit 54 loads the value as the q-axis current command value iq* corresponding to the value ida*, that is, the value iqa*. Meanwhile, if the weak magnetic field current Δid takes the positive value, and accordingly the weak magnetic field control is executed, the subtractor 55 and the q-axis current command value calculation unit 54 serve to increase the d-axis current command value id* to the value idb* which is larger by the weak magnetic field current Δid in the negative direction, for example. Accordingly, the q-axis current command value calculation unit 54 decreases the q-axis current command value iq* to the value iqb* which is smaller than the value iqa* with respect to the positive direction.

Next, the operation of the voltage command value set unit 48 will be described.

The current control unit 61 executes the current control processing and the axis voltage command value set processing, and receives the d-axis current command value id* sent from the d-axis current command value calculation unit 53 via the subtractor 55 and the q-axis current command value iq* sent from the q-axis current command value calculation unit 54. It further receives the d-axis current id and the q-axis current iq from the 3-phase to 2-phase transformation unit 49 to load the drive motor target torque TM* and the voltage speed ratio Vdc/ω for executing the feedback control. The operation state parameter calculation processing device (not shown) of the drive motor control unit 45 executes the operation state parameter calculation processing to divide the DC voltage Vdc by the angular velocity ω to calculate the voltage speed ratio Vdc/ω as the parameter representing the operation state of the drive motor 31.

Under the feedback control, based on the d-axis current command value id* and the q-axis current command value iq*, the current control unit 61 calculates the d-axis voltage command value vd* and the q-axis voltage command value vq* so as to be set as the first and the second axis voltage command values, respectively.

Therefore, the current control unit 61 calculates the current deviation Δid between the d-axis current command value id* and the d-axis current id, and the current deviation Δiq between the q-axis current command value iq* and the q-axis current iq, and executes the proportional-integral term calculation including the proportional control and the integral control based on the respective current deviations Δid and Δiq, and the parameters of the drive motor 31.

Thereafter, the voltage control unit 62 executes the voltage control processing and the phase voltage command value set processing to load the d-axis voltage command value vd*, the q-axis voltage command value vq*, the DC voltage Vdc and the magnetic pole position θ to calculate the voltage command values vu*, vv* and vw* as the first to the third phase voltage command values through the 2/3-phase transformation, which are then sent to the PWM generator 50.

The voltage command value is defined by the d-axis voltage command value vd*, the q-axis voltage command value vq*, and the voltage command values vu*, vv*, vw*, respectively.

The parameters include the counter-electromotive voltage constant MIf, each winding resistance Ra of the stator coils, and inductance values Ld and Lq, and are used for calculation of the interference term to suppress the interference between the d-axis and the q-axis.

The inductance values Ld and Lq vary depending on the operation state upon driving the drive motor 31. When the characteristics of the control system change as the inductance values vary, it is difficult to drive the drive motor 31 in the stable state.

In the embodiment, the static inductances Lds and Lqs as the first inductance, and the dynamic inductance values Ldd and Lqd as the second inductance are used for the inductance values Ld and Lq, respectively.

Next, the static inductances Lds and Lqs, and the dynamic inductances Ldd and Lqd will be described.

Figure 7:
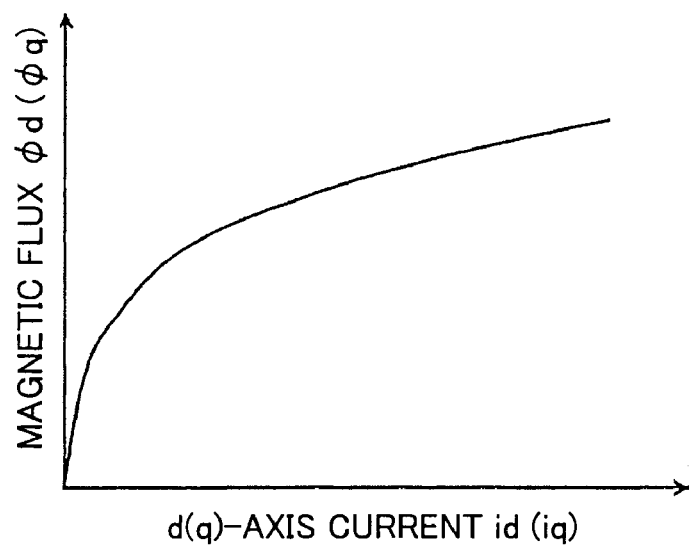
FIG. 7 is a view showing a characteristic of the drive motor according to the embodiment of the present invention.

When the voltage speed ratio Vdc/ω is made constant, and the d-axis current id (q-axis current iq) is increased from zero, the results of the measurement of the magnetic flux φd (φq) generated by the coil shows that the magnetic flux φd (φq) is increased as the d-axis current id (q-axis current iq) becomes high. The magnetic flux φd (φq) is proportional to the d-axis voltage vd (q-axis voltage vq). Therefore, in the region where the d-axis current id (q-axis current iq) is low, the magnetic flux φd (φq) is largely changed to largely change the d-axis voltage vd (q-axis voltage vq) only by slightly changing the d-axis current id (q-axis current iq). Meanwhile, in the region where the d-axis current id (q-axis current iq) is high, the magnetic flux φd (φq) hardly changes even if the d-axis current id (q-axis current iq) is changed, thus failing to change the d-axis voltage vd (q-axis voltage vq) as shown in FIG. 7 (the x-axis is set as a d(q)-axis current id (iq), and the y-axis is set as a magnetic flux φd (φq)).

Therefore, the value obtained by dividing magnetic flux φd (φq) by the d-axis current id (q-axis current iq) is set to the static inductances Lds and Lqs, respectively, which are expressed in the following equations:

$$Lds = \phi d / id$$

$$Lqs = \phi q / iq$$

Figure 8:
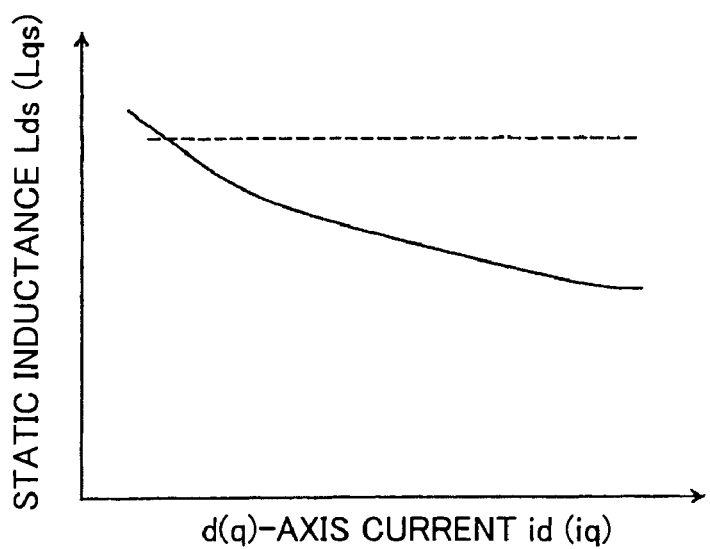
FIG. 8 is a view showing a characteristic of a static inductance according to the embodiment of the present invention.

Accordingly, it is possible to obtain the relationship between the d-axis current id (q-axis current iq) and the static inductances Lds and Lqs as shown in FIG. 8 (the x-axis is set as the d (q)-axis current id (iq), and the y-axis is set a as a static inductance Lds (Lqs)). In this case, the static inductances Lds and Lqs obtained by increasing the d-axis current id (q-axis current iq) from zero are gradually decreased by a small amount.

Assuming that the values obtained by differentiating the magnetic flux φd (φq) with the d-axis current id (q-axis current iq) are set to the dynamic inductance values Ldd and Lqd, they are expressed by Eq. 3.

$$Ldd = \frac{d\phi d}{did} \qquad (3)$$

$$Lqd = \frac{d\phi q}{did}$$

Figure 9:
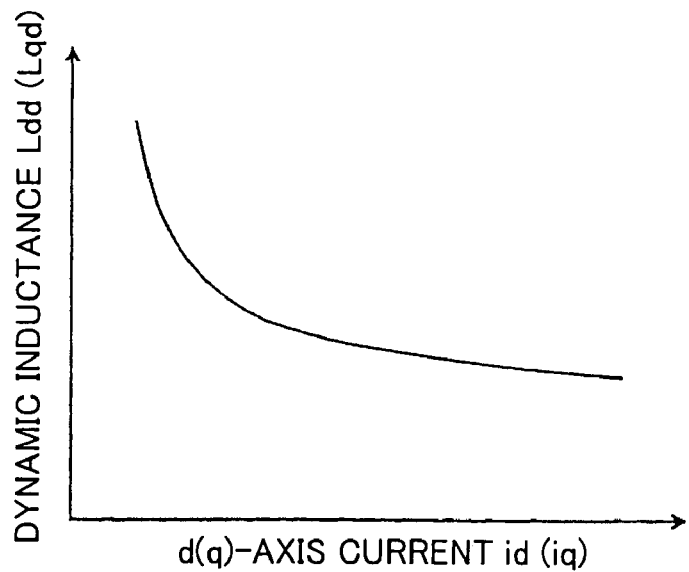
FIG. 9 is a view showing a characteristic of a dynamic inductance according to the embodiment of the present invention.

This makes it possible to obtain the relationship between the d-axis current id (q-axis current iq) and the dynamic inductances Ldd and Lqd as shown in FIG. 9 (the x-axis is set as the d(q)-axis current id (iq), and the y-axis is set as a dynamic inductance Ldd (Lqd)). In this case, in the region where the d-axis current id (q-axis current iq) is low, the dynamic inductances Ldd and Lqd become large. In the region where the d-axis current id (q-axis current iq) is high, the dynamic inductances Ldd and Lqd become small. In the region where the d-axis current id (q-axis current iq) is low, the amount of change in the d-axis voltage command value vd* (q-axis voltage command value vq*) with respect to the amount of change in the d-axis current id (q-axis current iq) may be increased. In the region where the d-axis current id (q-axis current iq) is high, the amount of change in the d-axis voltage command value vd* (q-axis voltage command value vq*) with respect to the amount of change in the d-axis current id (q-axis current iq) may be decreased.

In this way, when the d-axis current id (q-axis current iq) changes, the amount by which the static inductances Lds and Lqs, and the dynamic inductances Ldd and Lqd changes is different. The calculated value or the estimated value of the magnetic flux φd (φq) may be used for calculating the static inductances Lds and Lqs, and the dynamic inductances Ldd and Lqd.

Next, the current control unit 61 will be described in detail.

Figure 1:
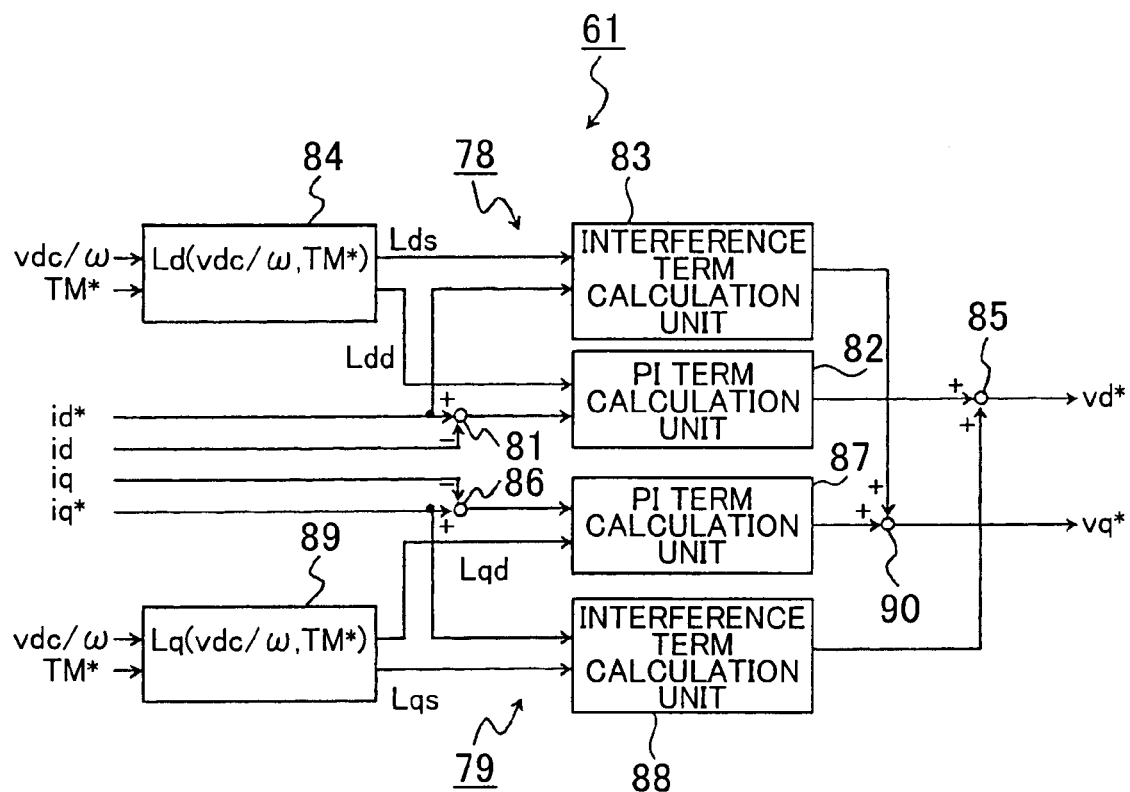
FIG. 1 is a block diagram of a current control unit according to an embodiment of the present invention.

Referring to FIG. 1, the current control unit 61 includes voltage command value calculation units 78 and 79 each serving as the first and the second voltage command value calculation processing device.

The voltage command value calculation unit 78 includes a subtractor 81 as the first deviation calculation processing device, a PI term calculation unit 82 as the first proportional-integral term calculation processing device, an interference term calculation unit 83 as the first interference term calculation processing device, an inductance calculation unit (Ld (Vdc/ω, TM*)) 84 as the first parameter calculation processing device, and an adder 85 as the first voltage command value adjustment processing device to execute the feedback control such that the d-axis current id becomes the d-axis current command value id* based on the current deviation Δid which represents the deviation between the d-axis current id and the d-axis current command value id*.

The voltage command value calculation unit 79 includes a subtractor 86 as the second deviation calculation processing device, a PI term calculation unit 87 as the second proportional-integral term calculation processing device, an interference term calculation unit 88 as second interference term calculation processing device, an inductance calculation unit (Lq(Vdc/ω, TM*)) 89 as the second parameter calculation processing device, and an adder 90 as the second voltage command value adjustment processing device to execute the feedback control such that the q-axis current iq becomes the q-axis current command value iq* based on the current deviation Δiq which represents the deviation between the q-axis current iq and the q-axis current command value iq*.

In the voltage command value calculation unit 78, the subtractor 81 executes the deviation calculation processing, loads the d-axis current id and the d-axis current command value id*, and calculates the current deviation Δid so as to be sent to the PI term calculation unit 82.

Under the feedback control by the voltage command value calculation unit 78, in the region where the d-axis current id is low, it is preferable to increase the amount of change in the d-axis voltage command value vd* with respect to the amount of change in the d-axis current id. In the region where the d-axis current id is high, it is preferable to decrease the amount of change in the d-axis voltage command value vd* with respect to the amount of change in the d-axis current id.

Figure 10:
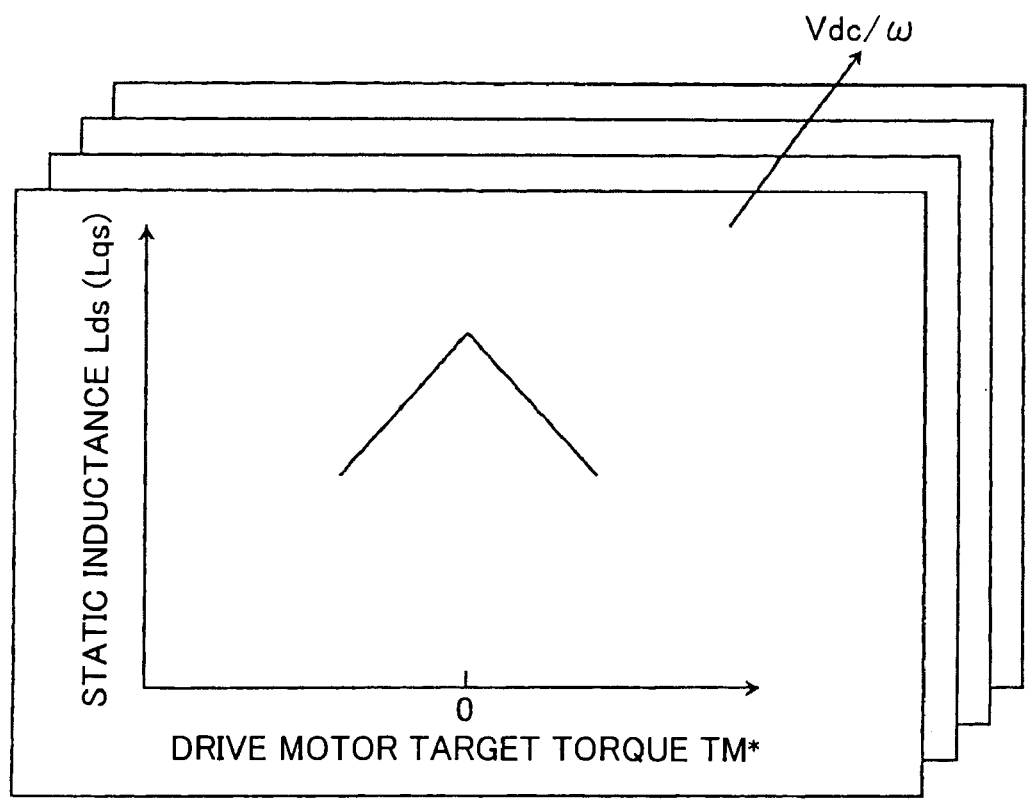
FIG. 10 is a view showing a first inductance map according to the embodiment of the present invention.

The inductance calculation unit 84 executes the first parameter calculation processing, loads the voltage speed ratio Vdc/ω and the drive motor target torque TM*, calculates the static inductance Lds and the dynamic inductance Ldd on the d-axis in reference to the inductance maps shown in FIG. 10 (the x-axis is set as the drive motor target torque TM*, and the y-axis is set as the static inductance Lds (Lqs)) and 11 (the x-axis is set as the drive motor target torque TM*, and the y-axis is set as the dynamic inductance Ldd (Lqd)), and sends the static inductance Lds to the interference term calculation unit 83 and the dynamic inductance Ldd to the PI term calculation unit 82, respectively.

The PI term calculation unit 82 executes the first proportional-integral term calculation processing, and loads the current deviation Δid and the dynamic inductance Ldd, based on which the voltage drop Vzd is calculated and sent to the adder 85. The PI term calculation unit 82 includes the proportional term calculation unit as the proportional term calculation processing device, the integral term calculation unit as the integral term calculation processing device, and the adder as the voltage drop calculation processing device.

The proportional term calculation unit executes the proportional term calculation processing to calculate the gain Gpd (Ldd) for the proportional term calculation expressed as the function of the dynamic inductance Ldd. Based on the current deviation Δid and the gain Gpd (Ldd), the voltage drop Vzdp that represents the voltage command value of the proportional term is calculated as the proportional term calculation value using the following equation:

$$Vzdp = Gpd(Ldd) \times \Delta id.$$

Based on the current deviation Δid and the integral term calculation gain Gid, the integral term calculation unit executes the integral term calculation processing to calculate the voltage drop Vzdi that represents the voltage command value of the integral term as the integral term calculation value using the following equation:

$$Vzdi = Gid \times \Sigma \Delta id$$

The adder 85 executes the voltage drop calculation processing to add the voltage drop values Vzdp and Vzdi to calculate the voltage drop Vzd using the following equation:

$$Vzd = Vzdp + Vzdi = Gpd(Ldd) \times \Delta ipd + Gid \times \Sigma \Delta id$$

The interference term calculation unit 83 executes the first interference term calculation processing to load the angular velocity ω, the counter-electromotive voltage constant MIf, the d-axis current command value id*, and the static inductance Lds, based on which, the induced voltage eq induced by the d-axis current id of the interference term is calculated using the following equation to be sent to the adder 90:

$$eq = -\omega(MIf + Lds \times id^*)$$

Meanwhile, in the voltage command value calculation unit 79, the subtractor 86 executes the deviation calculation processing to load the q-axis current iq and the q-axis current command value iq* to calculate the current deviation Δiq so as to be sent to the PI term calculation unit 87.

Under the feedback control executed by the voltage command value calculation unit 79, in the region where the q-axis current iq is low, it is preferable to increase the amount of change in the q-axis voltage command value vq* with respect to the amount of change in the q-axis current iq. Meanwhile in the region where the q-axis current iq is high, it is preferable to decrease the amount of change in the q-axis voltage command value vq* with respect to the amount of change in the q-axis current iq.

Figure 11:
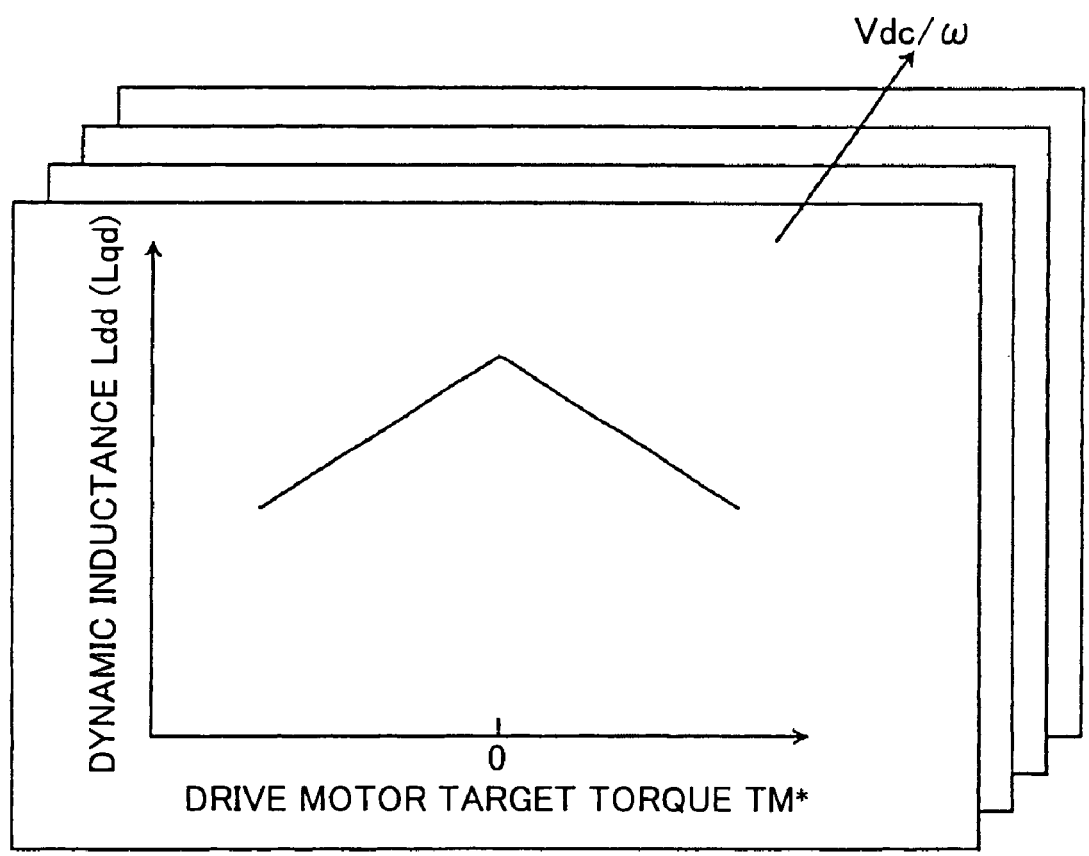
FIG. 11 is a view showing a second inductance map according to the embodiment of the present invention.

The inductance calculation unit 89 executes the second parameter calculation processing and loads the voltage speed ratio Vdc/ω and the drive motor target torque TM* to calculate the static inductance Lqs and the dynamic inductance Lqd on the q-axis in reference to the inductance map shown in FIGS. 10 and 11, and to send the static inductance Lqs to the interference term calculation unit 88 and the dynamic inductance Lqd to the PI term calculation unit 87, respectively.

The PI term calculation unit 87 executes the second proportional-integral term calculation processing to load the current deviation Δiq and the dynamic inductance Lqd, based on which, the voltage drop Vzq is calculated so as to be sent to the adder 90. Therefore, the PI term calculation unit 87 includes the proportional term calculation unit as the proportional calculation processing device, the integral term calculation unit as the integral term calculation processing device, and the adder as the voltage drop calculation processing device.

The proportional term calculation unit executes the proportional term calculation processing to calculate the gain Gpq (Lqd) for the proportional term calculation expressed as the function of the dynamic inductance Lqd in accordance therewith. Based on the current deviation Δiq and the gain Gpd (Lqd), the voltage drop Vzqp which represents the voltage command value of the proportional term is calculated as the proportional term calculation value using the following equation:

$$Vzqp = Gpq(Lqd) \times \Delta iq$$

The integral term calculation unit executes the integral term calculation processing to calculate the voltage drop Vzqi which represents the voltage command value of the integral term as the integral term calculation value based on the current deviation Δiq and the gain Giq for the integral term calculation, which is expressed by the following equation:

$$Vzqi = Giq \times \Sigma \Delta iq$$

The adder 90 executes the voltage drop calculation processing to add the voltage drop values Vzqp and Vzqi to obtain the voltage drop Vzq as expressed by the following equation:

$$Vzq = Vzqp + Vzqi = Gpq(Lqd) \times \Delta iq + Giq \times \Sigma \Delta iq$$

The interference calculation unit 88 executes the second interference term calculation processing to load the angular velocity ω, the q-axis current command value iq* and the static inductance Lqs, based on which the induced voltage ed induced by the q-axis current iq of the interference term is calculated as expressed by the following equation so as to be sent to the adder 85.

$$Ed = -\omega \times Lqs \cdot iq^*$$

The adder 85 adds the voltage drop Vzd sent from the PI term calculation unit 82 to the induced voltage ed sent from the inductance calculation unit 88 to obtain the d-axis voltage command value vd* as the output voltage expressed by the following equation:

$$Vd^* = Vzd + ed$$
$$= Vzd - \omega \times Lqs \times iq^*$$

The adder 90 adds the voltage drop Vzq sent from the PI term calculation unit 87 to the induced voltage eq sent from the interference term calculation unit 83 to obtain the q-axis voltage command value vq* as the output voltage expressed by the following equation:

$$Vq^* = Vzq + eq$$
$$= Vzq + \omega(MIf + Lds \times id^*)$$

The d-axis voltage command value vd* is generated such that the d-axis current deviation δid becomes zero, and the q-axis voltage command value vq* is generated such that the q-axis current deviation δiq becomes zero. Those d-axis voltage command value vd* and the q-axis voltage command value vq* are sent to the voltage control unit 62.

In the embodiment of the present invention, the d-axis current command value id* is used for calculating the induced voltage eq in the first interference term calculation processing. The q-axis current command value iq* is used for calculating the induced voltage ed in the second interference term calculation processing. Alternatively, the d-axix current id and the q-axis current iq may be used instead of the d-axis current command value id* and the q-axis current command value iq*, respectively.

As the interference term, the static inductance required for obtaining the magnetic flux necessary for the interference term may be used. As the PI term, the dynamic inductance required for obtaining the amount of change in the magnetic flux necessary for the proportional term gain may be used. The characteristic of the control system is not changed by the drive state of the drive motor 31. This makes it possible to keep the characteristic of the control system constant over the wide operation range.

In the embodiment, the drive motor is described as the electric machine. However, the present invention is applicable to the generator as the electric machine. The electric automobile is described as the electric vehicle. Alternatively, the present invention is applicable to the hybrid vehicle. In the hybrid vehicle, the drive motor and the generator are provided as the first and the second electric machines, respectively.

The present invention is not limited to the aforementioned embodiment, and various modifications are possible within the scope of the present invention. They are not excluded from the claims of the present invention.

The present invention is applicable to the electric drive unit mounted on the hybrid vehicle.

According to an exemplary aspect of the invention, the interference term is calculated based on the first inductance value, and the proportional term and the integral term are calculated based on the current deviation and the second inductance value. This makes it possible to make characteristics of the control system constant over the wide operation range, thus enhancing the stability of the electric machine control unit. This may also enhance the response of the electric machine control unit for regulating the current to the current command value.

According to another exemplary aspect of the invention, there is no change in the characteristic of the control system in the driving state of the electric machine. The electric machine can thus be driven in the stable state.

What is claimed is:

1. An electric drive control apparatus, comprising:
   a current command value calculation processing device that calculates a current command value based on an electric machine target torque that represents a target value of a torque of an electric machine;
   a deviation calculation processing device that calculates a current deviation between the current command value and a current applied to the electric machine;
   a parameter calculation processing device that calculates a first inductance and a second inductance that each have a different amount of change caused by a change in the current;
   a interference term calculation processing device that calculates an interference term based on the first inductance;
   a proportional-integral term calculation processing device that calculates a proportional term and an integral term based on the current deviation and the second inductance; and
   a voltage command value adjustment processing device that calculates a voltage command value based on the interference term, the proportional term and the integral term.

2. The electric drive control apparatus according to claim 1, wherein the first inductance is a value obtained by dividing a magnetic flux by a value of the current.

3. The electric drive control apparatus according to claim 1, wherein the second inductance is a value obtained by differentiating a magnetic flux with a value of the current.

4. The electric drive control apparatus according to claim 1, wherein the parameter calculation processing device calculates the first inductance and the second inductance based on a voltage speed ratio and an electric machine target torque, respectively.

5. The electric drive control apparatus according to claim 1, wherein the proportional-integral term calculation processing device calculates a gain for the integral term based on the second inductance.

6. An electric drive control method, comprising:
calculating a current command value based on an electric machine target torque that represents a target value of a torque of an electric machine;
calculating a current deviation between the current command value and a current applied to the electric machine;
calculating a first inductance and a second inductance that each have a different amount of change caused by a change in the current;
calculating an interference term based on the first inductance;
calculating a proportional term and an integral term based on the current deviation and the second inductance; and
calculating a voltage command value based on the interference term, the proportional term and the integral term.

7. The electric drive control method according to claim 6, wherein the first inductance is a value obtained by dividing a magnetic flux by a value of the current.

8. The electric drive control method according to claim 6, wherein the second inductance is a value obtained by differentiating a magnetic flux with a value of the current.

9. The electric drive control method according to claim 6, wherein the first inductance and the second inductance are calculated based on a voltage speed ratio and an electric machine target torque, respectively.

10. The electric drive control method according to claim 6, wherein a gain is calculated for the integral term based on the second inductance.

11. An electric drive control apparatus, comprising:
a controller that:
calculates a current command value based on an electric machine target torque that represents a target value of a torque of an electric machine;
calculates a current deviation between the current command value and a current applied to the electric machine;
calculates a first inductance and a second inductance that each have a different amount of change caused by a change in the current;
calculates an interference term based on the first inductance;
calculates a proportional term and an integral term based on the current deviation and the second inductance; and
calculates a voltage command value based on the interference term, the proportional term and the integral term.

12. The electric drive control apparatus according to claim 11, wherein the first inductance is a value obtained by dividing a magnetic flux by a value of the current.

13. The electric drive control apparatus according to claim 11, wherein the second inductance is a value obtained by differentiating a magnetic flux with a value of the current.

14. The electric drive control apparatus according to claim 11, wherein the controller calculates the first inductance and the second inductance based on a voltage speed ratio and an electric machine target torque, respectively.

15. The electric drive control apparatus according to claim 11, wherein the controller calculates a gain for the integral term based on the second inductance.

* * * * *